(12) United States Patent
Kawamura et al.

(10) Patent No.: US 9,065,261 B2
(45) Date of Patent: Jun. 23, 2015

(54) CONNECTING STRUCTURE, CONNECTING DEVICE AND CONNECTING METHOD FOR ELECTRIC WIRE AND TERMINAL, AND WIRE HARNESS

(71) Applicants: FURAKAWA ELECTRIC CO., LTD., Tokyo (JP); FURUKAWA AUTOMOTIVE SYSTEMS INC., Shiga (JP)

(72) Inventors: Yukihiro Kawamura, Shiga (JP); Satoshi Takamura, Shiga (JP); Katsunori Takeda, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 149 days.

(21) Appl. No.: 13/854,615

(22) Filed: Apr. 1, 2013

(65) Prior Publication Data
US 2013/0213709 A1 Aug. 22, 2013

Related U.S. Application Data

(63) Continuation of application No. PCT/JP2011/072566, filed on Sep. 30, 2011.

(30) Foreign Application Priority Data

Sep. 30, 2010 (JP) .................................. 2010-222215

(51) Int. Cl.
*H02G 3/04* (2006.01)
*H02G 1/00* (2006.01)
(Continued)

(52) U.S. Cl.
CPC ......... *H02G 3/0406* (2013.01); *Y10T 29/49117* (2015.01); *H01R 4/183* (2013.01); *H01R 43/24* (2013.01); *H01R 4/18* (2013.01); *H02G 1/00* (2013.01)

(58) Field of Classification Search
CPC .......... H02G 3/046; H02G 3/00; H02G 3/02; H02G 3/04; H02G 1/00; H01R 4/183; H01R 4/18; H01R 4/10; H01R 4/20; H01R 43/24; H01R 43/18; Y10T 29/49117
USPC ........ 174/74 R, 68.1, 68.3, 72 A, 72 R, 84 C; 439/730, 936; 425/116; 29/825
See application file for complete search history.

(56) References Cited

U.S. PATENT DOCUMENTS 5,795,170 A * 8/1998 Okabe ........................... 439/936
6,761,551 B2 * 7/2004 Kondo ........................... 425/116
(Continued)

FOREIGN PATENT DOCUMENTS

| JP | 56-089178 U | 7/1981 |
|---|---|---|
| JP | 5-8871 U | 2/1993 |

(Continued)

OTHER PUBLICATIONS

International Search Report issued in PCT/JP2011/072566, mailing date Dec. 27, 2011 (2 pages).

*Primary Examiner* — Angel R Estrada
(74) *Attorney, Agent, or Firm* — Osha Liang LLP

(57) ABSTRACT

A connecting structure is applied for connecting an electric wire and a terminal. For coating a connecting portion of a conductor of the electric wire and the terminal, which form a wire harness, with a coating resin, a portion of an insulator, which is to be inserted into a terminal insertion hole of a connector housing, is subjected to a diameter reduction process such that an outer diameter of the coating resin coated on the insulator is smaller than the terminal insertion hole.

16 Claims, 6 Drawing Sheets

(51) Int. Cl.
  *H01R 4/18*   (2006.01)
  *H01R 43/24*  (2006.01)

(56) References Cited

U.S. PATENT DOCUMENTS

| | | | |
|---|---|---|---|
| 6,796,781 B2 * | 9/2004 | Kondo | 425/116 |
| 7,238,884 B2 * | 7/2007 | Tanaka et al. | 174/74 R |
| 7,690,954 B2 * | 4/2010 | Watanabe et al. | 439/730 |
| 8,723,040 B2 * | 5/2014 | Sakura | 174/74 R |
| 8,802,987 B2 * | 8/2014 | Morikawa et al. | 174/74 R |
| 2013/0126235 A1 * | 5/2013 | Tanikawa et al. | 174/77 R |
| 2013/0199842 A1 * | 8/2013 | Inoue et al. | 174/84 C |
| 2013/0309903 A1 * | 11/2013 | Iio | 439/730 |

FOREIGN PATENT DOCUMENTS

| | | |
|---|---|---|
| JP | 5-31131 U | 4/1993 |
| JP | 2009-230998 A | 10/2009 |
| JP | 2010-135121 A | 6/2010 |

\* cited by examiner

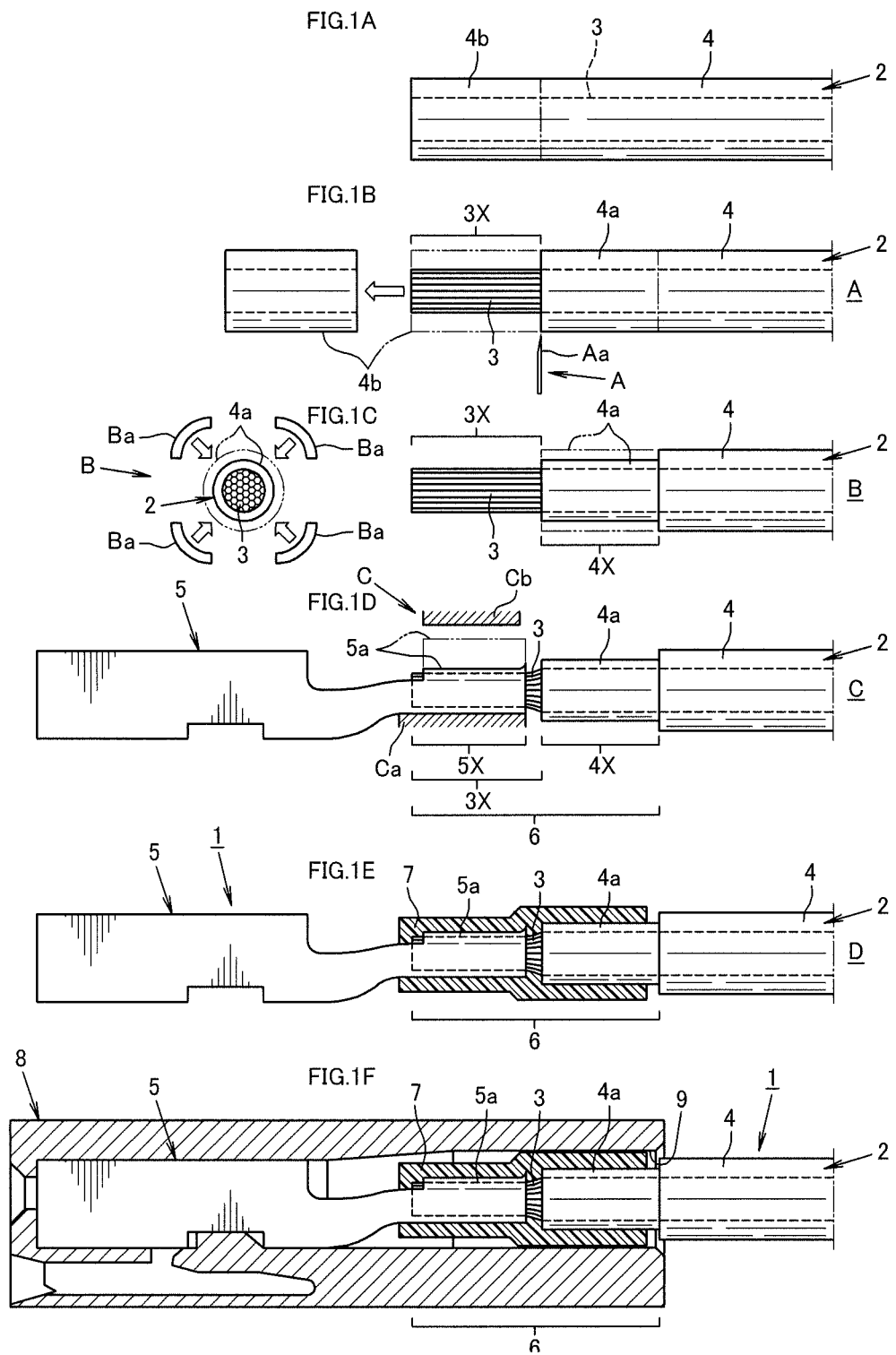

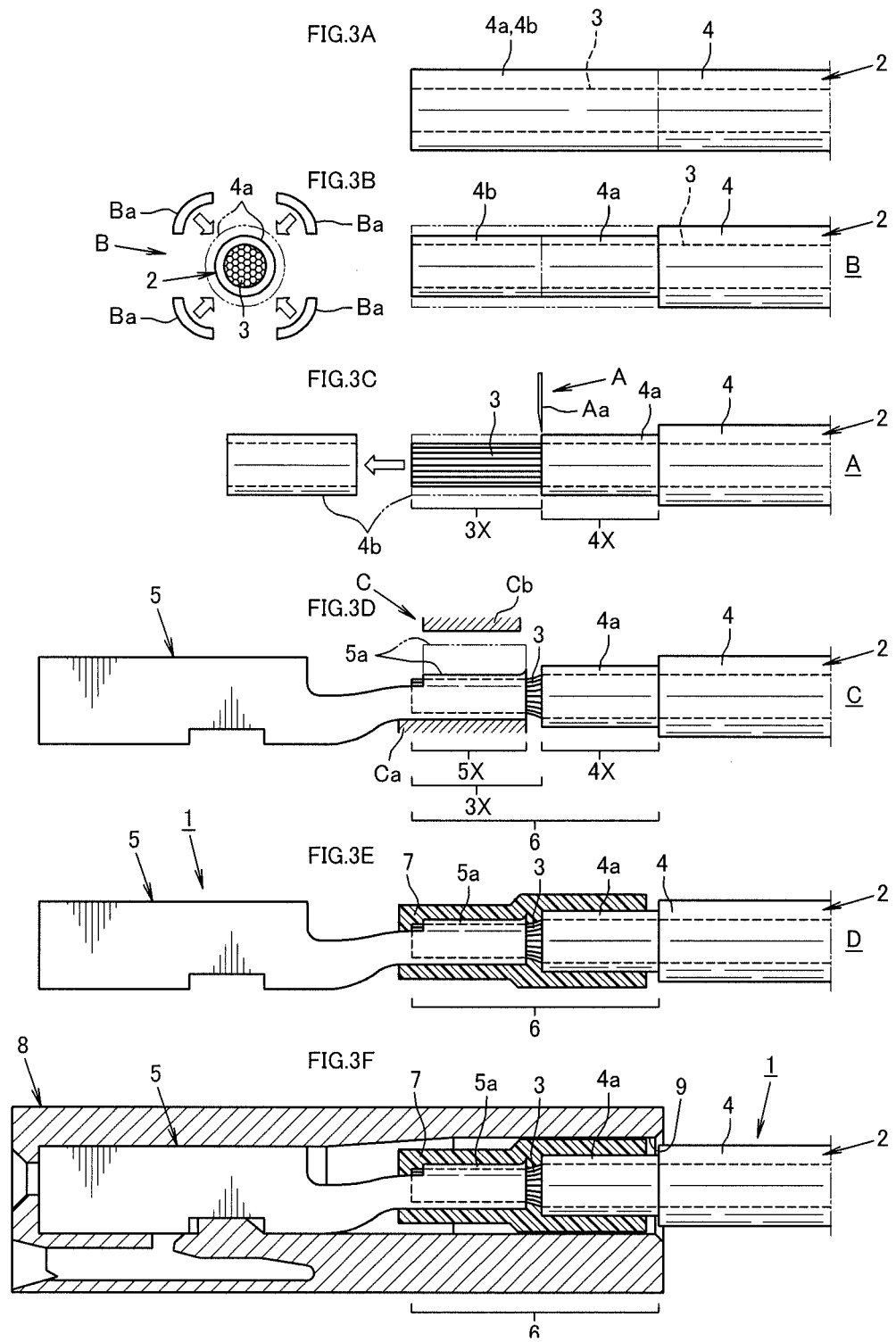

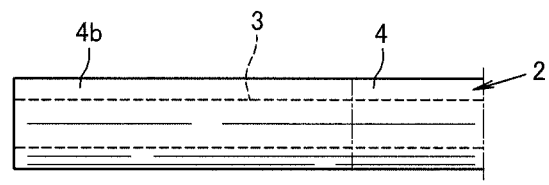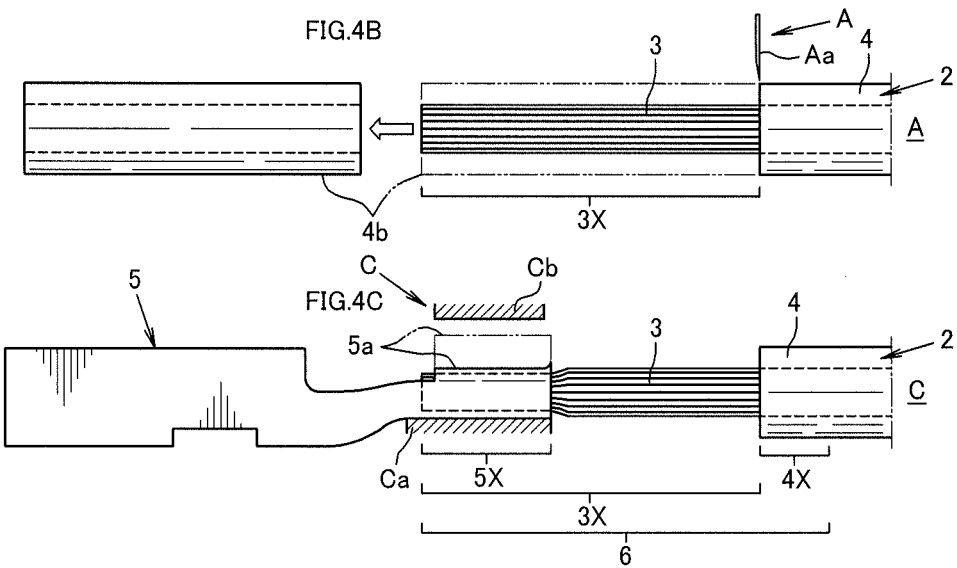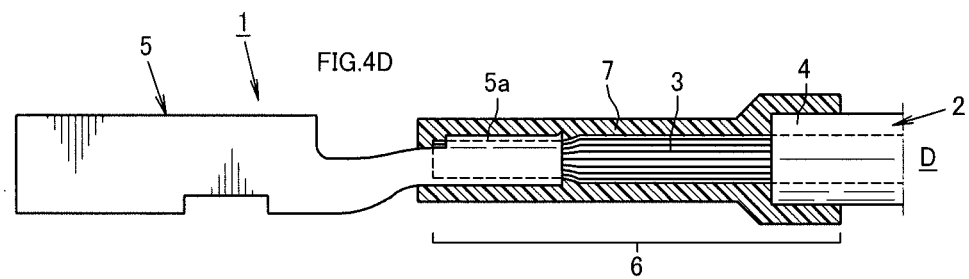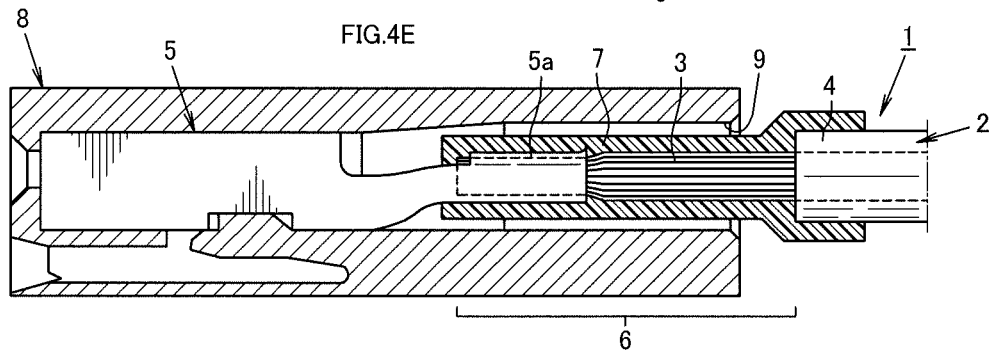

PRIOR ART

CONNECTING STRUCTURE, CONNECTING DEVICE AND CONNECTING METHOD FOR ELECTRIC WIRE AND TERMINAL, AND WIRE HARNESS

TECHNICAL FIELD

The present invention relates to a connecting structure, a connecting device and a connecting method for electric wires and terminals, and a wire harness which prevent corrosion in connecting portions of electric wire conductors and terminals.

BACKGROUND ART

As a method for preventing corrosion (hereinafter, referred to as "anti-corrosion") in connecting portions between electric wire conductors and terminals to which the conductors are connected as mentioned above, a waterproof method and water proof device for end connecting portions of coated electric wires (see Patent Document 1) has been proposed, for example.

More specifically, in the method and the device of Patent Document 1, an end connecting portion where a conductor of a coated electric wire and a terminal metal fitting are connected is set in a cavity of a shaping die, and a side opening of the cavity from which the coated electric wire is drawn outside is blocked with an elastic baffle plate. Then, a molten mold resin is injected into the cavity to coat the end connecting portion with the mold resin.

However, as the above-mentioned mold resin also covers an insulating coating of the coated electric wire, an outer diameter of the mold resin coated on the insulating coating becomes large (see FIG. 3 of Patent Document 1). Accordingly, for example, as shown in FIG. 6, when a connecting portion of a coated electric wire 52 of a wire harness 51 and a terminal metal fitting 55 is coated with a mold resin 57 using the above-described method and the device, an outer diameter of the mold resin 57 coated on the insulating coating 54, which is to be inserted into a terminal insertion hole 59 of a connector housing 58, becomes larger than an inner diameter of the terminal insertion hole 59.

Therefore, for inserting the terminal metal fitting 55 connected to the coated electric wire 52 of the wire harness 51 into the terminal insertion hole 59 of the connector housing 58, the mold resin 57 coated on the insulating coating 54 of the coated electric wire 52 abuts a peripheral portion of an inlet side of the terminal insertion hole 59, and the terminal metal fitting 55 cannot be inserted into a predetermined position.

Further, there is a problem that the terminal insertion hole 59 of the connector housing 58 has to be processed into a size which allows to insert the terminal metal fitting 55 coated with the mold resin 57, the connector housing 58 itself has to be enlarged, and/or a dedicated connector housing 58 has to be manufactured, thereby increasing the cost.

PRIOR ART DOCUMENTS

Patent Documents

Patent Document 1: Laid-open Patent Publication No. 2010-135121

SUMMARY OF THE INVENTION

Problems to be Solved by the Invention

An objective of the present invention is to provide a connecting structure, a connecting device, and a connecting method for electric wires and terminals which allow terminals connected to electric wire conductors to be smoothly inserted into terminal insertion holes of connector housings, and a wire harness using electric wires having such a connecting structure.

Means for Solving the Problems

The present invention is characterized in that it is a connecting structure for an electric wire and a terminal, in which a terminal to be inserted into a terminal insertion hole of a connector housing is crimped to a conductor exposed by stripping off a coated insulator at an end portion of an electric wire, and a coating resin coated on a connecting portion formed of a conductor exposed portion of the conductor exposed at the end portion of the electric wire, an insulator coated portion which is adjacent to the conductor exposed portion and is coated with the insulator, and a conductor crimping portion of the terminal, to which the conductor is connected, is formed into a thickness which allows it to be inserted into the terminal insertion hole of the connector housing.

With the above connecting structure, the coated resin coated on the connecting portion of the conductor of the electric wire and the terminal is formed into a thickness which allows it to be inserted into the terminal insertion hole of the connector housing. Thus, the terminal connected to the electric wire can be smoothly inserted into the terminal insertion hole of the connector housing.

As a result, the terminal can be inserted into a connector housing with a smaller terminal insertion hole. For example, it can be inserted into existing connector housings with small terminal insertion holes which have been applied to terminals which do not require coating with coating resins.

Therefore, the terminal insertion hole of the connector housing does not have to be processed to be a big hole, the connector housing itself does not have to be enlarged, or a dedicated connector housing does not have to be newly manufactured.

Further, since the connecting portion from the insulator coating portion to the conductor crimping portion is coated with the coating resin, it becomes possible to ensure connection between the terminal and the electric wire with no external force being directly applied to the conductor crimping portion even there is no insulation barrel for crimping the insulator formed on the terminal, for example.

In one embodiment of the present invention, a portion of the insulator coated on the end portion of the electric wire, which is to be inserted further from an inlet of the terminal insertion hole, may be stripped off, and the insulator of the insulator coated portion, which is to be inserted around the inlet of the terminal insertion hole, may be processed to be thin.

Further, a portion of the insulator coated on the end portion of the electric wire, which is to be inserted into the terminal insertion hole, may be processed to be thin, and a portion of the insulator, which is to be inserted further from an inlet of the terminal insertion hole, may be stripped off, leaving the insulator coated portion which is to be inserted around the inlet of the terminal insertion hole.

With the above connecting structure, as the insulator of the insulator coated portion to be inserted into the terminal insertion hole is made thin, the coated resin coated on the insulator can be formed into a thickness which allows it to be inserted into the terminal insertion hole of the connector housing.

As a result, even when the coating resin covers the insulator of the electric wire to be inserted into the terminal insertion hole of the connector housing, the terminal to which the electric wire is connected can be smoothly inserted into the terminal insertion hole of the connector housing.

Accordingly, in the case where the terminal cannot be smoothly inserted into the terminal insertion hole, a poor electrical connection, which may happen when the connector is connected because the terminal cannot be inserted to a predetermined position of the terminal insertion hole, can be prevented.

Further, as the insulator is made thin, the coating resin to be coated on the insulator can be made thick by that thickness. Therefore, environment deterioration such as crack, chap, or the like is unlikely to occur, and the waterproof property can be enhanced.

In one embodiment of the present invention, the insulator coated on the end portion of the electric wire may be stripped off such that the conductor is exposed for a long length to an outer side from an inlet of the terminal insertion hole.

With the above connecting structure, the coating resin is directly coated on the conductor exposed for a long length to the outer side from the inlet of the terminal insertion hole. Thus, the thickness of the coating resin can be reduced from that for coating the coating resin on the insulator by the thickness of the insulator, thereby reducing the size.

As a result, the coating resin almost never contacts an inner wall of the terminal insertion hole, or even when it does, contact resistance is so small that the terminal can be smoothly inserted.

The present invention is characterized in that it is a wire harness formed of an electric wire having a connecting structure as described above.

With the above wire harness, the terminal connected to the electric wire can be smoothly inserted into the terminal insertion hole of the connector housing, and also, corrosion in the connecting portion of the conductor and the terminal formed of dissimilar metals, for example, an aluminum conductor and a copper terminal or the like, can be prevented.

As a result, a manufacturing efficiency for the wire harness can be improved, and also, a stable connection state can be maintained for a long time.

Further, the present invention is characterized in that it is a connecting device for connecting an electric wire and a terminal, in which a terminal to be inserted into a terminal insertion hole of a connector housing is crimped to a conductor exposed by stripping off a coated insulator at an end portion of an electric wire, comprising: insulator stripping means for stripping off the insulator coated on the end portion of the electric wire; terminal crimping means for crimping the terminal to the conductor exposed by stripping off the insulator; and resin coating means for coating a coating resin on a connecting portion formed of a conductor exposed portion of the conductor exposed at the end portion of the electric wire, an insulator coated portion which is adjacent to the conductor exposed portion and is coated with the insulator, and a conductor crimping portion of the terminal to which the conductor is connected, into a thickness which allows it to be inserted into the terminal insertion hole of the connector housing.

With the above connecting device, the coated resin is coated by the resin coating means on the connecting portion of the conductor of the electric wire and the terminal into a thickness which allows it to be inserted into the terminal insertion hole of the connector housing. Thus, the terminal connected to the electric wire can be smoothly inserted into the terminal insertion hole of the connector housing.

As a result, the terminal can be inserted into a connector housing with a smaller terminal insertion hole, and for example, a wire harness using existing connector housings with small terminal insertion holes, which have been applied to terminals which do not require coating with coating resins, can be manufactured without necessity of processing the terminal insertion hole of the connector housing to be a big hole, enlarging the connector housing itself, or newly manufacturing a dedicated connector housing.

In one embodiment of the present invention, a portion of the insulator coated on the end portion of the electric wire, which is to be inserted further from an inlet of the terminal insertion hole, may be stripped off by the insulator stripping means, and the insulator of the insulator coated portion, which is to be inserted around the inlet of the terminal insertion hole, may be processed to be thin by insulator thinning means.

Further, a portion of the insulator coated on the end portion of the electric wire, which is to be inserted into the terminal insertion hole, may be processed to be thin by the insulator thinning means, and a portion of the insulator, which is to be inserted further from an inlet of the terminal insertion hole, may be stripped off by the insulator stripping means, leaving the insulator coated portion which is to be inserted around the inlet of the terminal insertion hole.

With the above connecting device, as the insulator of the insulator coated portion to be inserted into the terminal insertion hole is made thin, the coated resin coated on the insulator can be formed into a thickness which allows it to be inserted into the terminal insertion hole of the connector housing.

As a result, even when the coating resin covers the insulator of the electric wire to be inserted into the terminal insertion hole of the connector housing, the terminal to which the electric wire is connected can be smoothly inserted into the terminal insertion hole of the connector housing.

Accordingly, in the case where the terminal cannot be smoothly inserted into the terminal insertion hole, a poor electrical connection, which may happen when the connector is connected because the terminal cannot be inserted to a predetermined position of the terminal insertion hole, can be prevented.

Further, as the insulator is made thin, the coating resin to be coated on the insulator can be made thick by that thickness. Therefore, environment deterioration such as crack, chap, or the like is unlikely to occur, and the waterproof property can be enhanced.

In one embodiment of the present invention, the insulator coated on the end portion of the electric wire may be stripped off by the insulator stripping means such that the conductor is exposed for a long length to an outer side from an inlet of the terminal insertion hole.

With the above connecting device, the coating resin is directly coated on the conductor exposed for a long length to the outer side from the inlet of the terminal insertion hole. Thus, the thickness of the coating resin can be reduced from that for coating the coating resin on the insulator by the thickness of the insulator, thereby reducing the size.

As a result, the coating resin almost never contacts an inner wall of the terminal insertion hole, or even when it does, contact resistance is so small that the terminal can be smoothly inserted.

Further, the present invention is characterized in that it is a connecting method for an electric wire and a terminal, in which a terminal to be inserted into a terminal insertion hole of a connector housing is crimped to a conductor exposed by stripping off a coated insulator at an end portion of an electric wire, wherein: the insulator coated on the end portion of the electric wire is stripped off, and the terminal is crimped to the conductor exposed by stripping off the insulator; and a connecting portion formed of a conductor exposed portion of the conductor exposed at the end portion of the electric wire, an insulator coated portion which is adjacent to the conductor exposed portion and is coated with the insulator, and a conductor crimping portion of the terminal to which the conductor is connected, is coated with a coating resin into a thickness which allows it to be inserted into the terminal insertion hole of the connector housing.

With the above connecting method, the coated resin is coated on the connecting portion of the conductor of the electric wire and the terminal into a thickness which allows it to be inserted into the terminal insertion hole of the connector housing. Thus, the terminal connected to the electric wire can be smoothly inserted into the terminal insertion hole of the connector housing.

As a result, it can be inserted into terminal insertion holes of existing connector housings the terminal without necessity of processing the terminal insertion hole of the connector housing to be a big hole, enlarging the connector housing itself, or newly manufacturing a dedicated connector housing.

Further, since the connecting portion from the insulator coating portion to the conductor crimping portion is coated with the coating resin, it becomes possible to ensure connection between the terminal and the electric wire with no external force being directly applied to the conductor crimping portion even there is no insulation barrel for crimping the insulator formed on the terminal, for example.

In one embodiment of the present invention, a portion of the insulator coated on the end portion of the electric wire, which is to be inserted further from an inlet of the terminal insertion hole, may be stripped off, and the insulator of the insulator coated portion, which is to be inserted around the inlet of the terminal insertion hole, may be processed to be thin.

Further, a portion of the insulator coated on the end portion of the electric wire, which is to be inserted into the terminal insertion hole, may be processed to be thin, and a portion of the insulator, which is to be inserted further from an inlet of the terminal insertion hole, may be stripped off, leaving the insulator coated portion which is to be inserted around the inlet of the terminal insertion hole.

With the above connecting method, as the portion of the insulator to be inserted into the terminal insertion hole is made thin, the coated resin coated on the insulator can be formed into a thickness which allows it to be inserted into the terminal insertion hole of the connector housing.

As a result, even when the coating resin covers the insulator of the electric wire to be inserted into the terminal insertion hole of the connector housing, the terminal to which the electric wire is connected can be smoothly inserted into the terminal insertion hole of the connector housing.

Accordingly, in the case where the terminal cannot be smoothly inserted into the terminal insertion hole, a poor electrical connection, which may happen when the connector is connected because the terminal cannot be inserted to a predetermined position of the terminal insertion hole, can be prevented.

Further, as the insulator is made thin, the coating resin to be coated on the insulator can be made thick by that thickness. Therefore, environment deterioration such as crack, chap, or the like is unlikely to occur, and the waterproof property can be enhanced.

In one embodiment of the present invention, the insulator coated on the end portion of the electric wire may be stripped off such that the conductor is exposed for a long length to an outer side from an inlet of the terminal insertion hole.

With the above connecting method, the coating resin is directly coated on the conductor exposed for a long length to the outer side from the inlet of the terminal insertion hole. Thus, the thickness of the coating resin can be reduced from that for coating the coating resin on the insulator by the thickness of the insulator, thereby reducing the size.

As a result, the coating resin almost never contacts an inner wall of the terminal insertion hole, or even when it does, contact resistance is so small that the terminal can be smoothly inserted.

The conductor of the electric wire may be formed of, for example, aluminum, aluminum alloy, copper or the like. Further, the terminal may be formed of, for example, copper, copper alloy or the like.

Further, the insulator thinning means may be formed of diameter reduction means for reducing diameter by applying a pressure to the insulator in a radial direction, cutting off means for cutting off by a cutting blade, laser or the like, cutting means for cutting by a cutting tool or cutting by blowing a fluid, heating means for diameter reduction by applying heat, dissolving means for dissolving by chemicals, solvent, or the like, and so on.

Effects of Invention

According to the present invention, the coated resin coated on the connecting portion of the conductor of the electric wire and the terminal is formed into a thickness which allows it to be inserted into the terminal insertion hole of the connector housing. Thus, the terminal connected to the conductor of the electric wire can be smoothly inserted into the terminal insertion hole of the connector housing.

BRIEF DESCRIPTION OF DRAWINGS

FIGS. 1A, 1B, 1C, 1D, 1E, and 1F show steps in a manufacturing process, in which an insulator on an electric wire end portion is subjected to diameter reduction and is cut off.

FIGS. 3A, 3B, 3C, 3D, 3E, and 3F show steps in another manufacturing process in which the insulator on the electric wire end portion is cut off and is subjected to diameter reduction.

FIGS. 4A, 4B, 4C, 4D, and 4E show steps in another manufacturing method in which the insulator on the electric wire end portion is cut off.

DESCRIPTION OF EMBODIMENTS

Hereinafter, an embodiment of the present invention will be described in details with reference of the drawings.

Figure 2A:
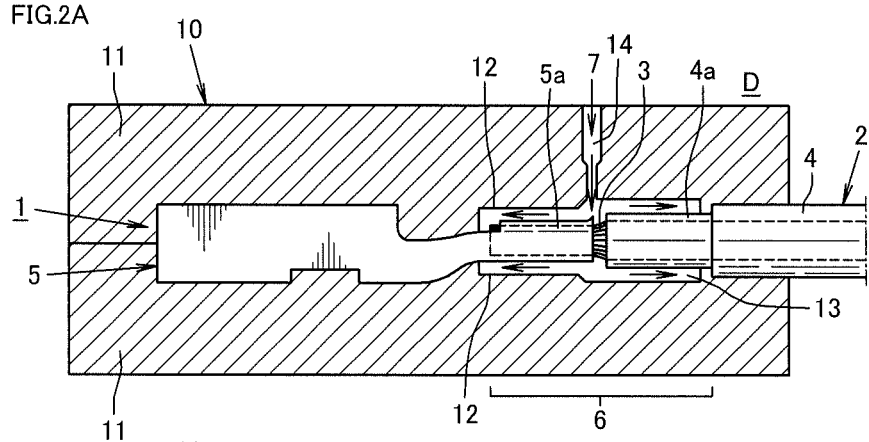
FIGS. 2A, 2B, and 2C show steps in a coating process for coating a connecting portion with a coating resin.
Figure 2B:
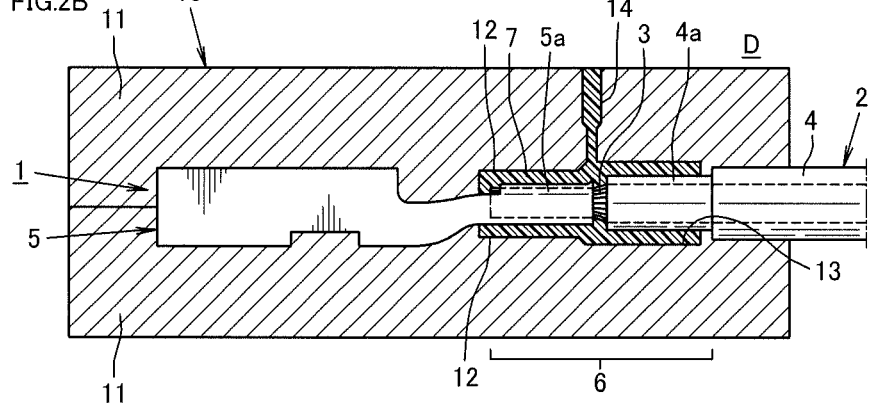

FIGS. 1A through 1F are process drawings showing a manufacturing method for a wire harness 1 in which an insulator 4 coated on an end portion of an electric wire 2 is subjected to diameter reduction and is cut off using a connecting device which will be described later. FIGS. 2A and 2B are process drawings showing a coating method for coating a connecting portion 6 with an insulating coating resin 7.

In the wire harness 1 of the present embodiment, an entire connecting portion 6 formed of a conductor exposed portion 3X of a conductor 3, which is exposed at an end portion of the electric wire 2, an insulator coated portion 4X, which is a portion adjacent to the conductor exposed portion 3X and is coated with the insulator 4, and a conductor crimping portion 5X of a terminal 5, which is crimped to the conductor 3 of the electric wire 2, is coated with the coating resin 7.

The connecting device for manufacturing the wire harness 1 of the present embodiment is formed of an insulator cutting off unit A for cutting off the insulator 4 coated on an end portion of the electric wire 2, an insulator diameter reduction unit B for reducing a diameter of the insulator 4 coated on the end portion, a terminal crimping unit C for crimping the terminal 5 to the conductor 3 exposed at the end portion, and a resin coating unit D for coating the connecting portion 6 where the conductor 3 and the terminal 5 are connected with the coating resin 7.

The insulator cutting off unit A is formed of a cutting blade Aa for cutting off the insulator 4 coated on the end portion of the electric wire 2. Specifically, without cutting the conductor 3 of the electric wire 2, the cutting blade Aa cuts off only the insulator 4 coated on the conductor 3 and exposes the conductor 3 for a desired length (see FIGS. 1B, 3C, and 4B).

The insulator diameter reduction unit B is formed of pressurizing members Ba for applying a pressure diametrically toward the center of the electric wire 2 to an insulator 4a coated on the end portion of the electric wire 2. The pressurizing members Ba are provided in a circumferential direction in equal intervals with the axial center of the electric wire 2 being the center.

Specifically, a pressure is applied diametrically toward the axial center of electric wire 2 by the pressurizing members Ba to the insulator 4a coated on the end portion of the electric wire 2, and the diameter of the insulator 4a of that portion is reduced. In other words, the insulator 4a coated on the end portion of the electric wire 2 is subjected to a diameter reduction process such that an outer diameter of the coated resin 7 coated on the insulator 4a becomes smaller than a terminal insertion hole 9 of a connector housing 8 (see FIGS. 1C and 3B).

The terminal crimping unit C is formed of an existing terminal crimping device (not shown) which crimps the terminal 5 of a conductive metal to the conductor 3 exposed at the end portion of the electric wire 2.

The above-mentioned terminal crimping device is formed of an anvil Ca (not shown) which supports a lower side of the terminal 5, and a crimper Cb (not shown) which calks and crimps the conductor crimping portion 5X of the terminal 5 to the conductor 3 of the electric wire 2.

Specifically, the conductor 3 exposed at the end portion of the electric wire 2 is inserted into the conductor crimping portion 5X of the terminal 5, and the lower side of the terminal 5 is supported by the anvil Ca. Then, a crimping piece 5a formed on the terminal 5 substantially into a U shape is calked by the crimper Cb and crimped to the conductor 3 of the electric wire 2, and the conductor crimping portion 5X of the terminal 5 is connected to the conductor 3 of the electric wire 2 (see FIGS. 1D, 3D, and 4C).

The resin coating unit D is formed of a resin coating device 10 which coats the entire connecting portion 6 where the conductor 3 of the electric wire 2 and the terminal 5 are connected, and a resin coating device 20 which will be described later.

Figure 2C:
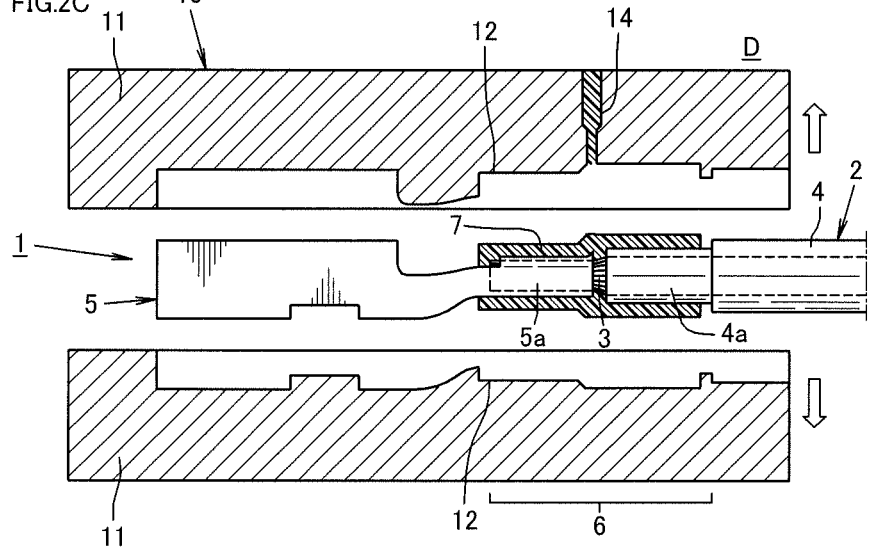

As shown in FIG. 2, the above-mentioned resin coating device 10 is formed of a pair of molds 11, 11, on which the connecting portion 6 where the conductor 3 of the electric wire 2 and the terminal 5 are connected is set. Inside the molds 11, shaping portions 12 of concave shapes which hold the connecting portion 6 where the conductor 3 and the terminal 5 are connected.

In one or both of the molds 11, a resin injection path 14 is formed to communicate with a resin injection space 13 which is formed between the above-mentioned connecting portion 6 and the shaping portions 12, 12. The resin injection path 14 is connected to a resin supply which supplies a thermoplastic molten resin (not shown).

Specifically, the coating resin 7 is coated so as to cover the entire connecting portion 6 formed of a conductor exposed portion 3X of a conductor 3, which is exposed at an end portion of the electric wire 2, an insulator coated portion 4X, which is a portion adjacent to the conductor exposed portion 3X and is coated with the insulator 4a, and a conductor crimping portion 5X of a terminal 5, to which the conductor 3 of the electric wire 2 is connected, substantially equally.

A manufacturing method for manufacturing a wire harness 1 with the above-described connecting device will be described.

First, an insulator 4b on a tip side, which is a portion to be inserted further from the inlet of the terminal insertion hole 9, is cutoff from the insulator 4 coated on the end portion of the electric wire 2 by the cutting blade Aa of the insulator cutting off unit A, leaving the insulator 4a of the insulator coating portion 4X to be inserted around the inlet of the terminal insertion hole 9 of the connector housing 8.

In other words, the conductor 3 of the electric wire 2 is exposed for a length which allows connection to the conductor crimping portion 5X of the terminal 5 (see FIGS. 1A and 1B).

Next, a pressure is applied to the portion adjacent to the conductor exposed portion 3X of the conductor 3, i.e., the insulator 4a of the insulator coating portion 4X to be inserted into the terminal insertion hole 9 of the connector housing 8, in a diameter direction toward the axial center of the electric wire 2 by the pressurizing members Ba of the insulator diameter reduction unit B such that it becomes thin.

In this way, the insulator 4a of the insulator coating portion 4X is treated with a diameter reduction process such that the outer diameter of the coated resin 7 coated on the insulator 4a is smaller than the terminal insertion hole 9 of the connector housing 8 (see FIG. 1C).

Next, for connecting the terminal 5 to the conductor 3 of the electric wire 2, the conductor 3 exposed at the end portion of the electric wire 2 is inserted into the conductor crimping portion 5X of the terminal 5, and the lower side of the terminal 5 is supported by the anvil Ca of the terminal crimping unit C. Then, the crimping piece 5a of the terminal 5 is treated with a calking process by the crimper Cb and is crimped to the conductor 3 of the electric wire 2 to connect the conductor crimping portion 5X of the terminal 5 to the conductor 3 of the electric wire 2 (see FIG. 1D).

Next, in the resin coating unit D shown in FIG. 2, the connecting portion 6 where the conductor 3 of the electric wire 2 and the terminal 5 are connected is set between molds 11 of the resin coating device 10, i.e., between shaping portions 12 of the molds 11. Then, molten resin supplied from the resin supply which is not shown is injected into the resin injection space 13 between the shaping portions 12 (see FIG. 2A).

The coating resin 7 is applied to the connecting portion 6 formed of the conductor exposed portion 3X of the conductor 3 exposed at the end portion of the electric wire 2, the insulator coated portion 4X which is the portion adjacent to the conductor exposed portion 3X and is coated with the insulator 4, and the conductor crimping portion 5X of the terminal 5, to which the conductor 3 of the electric wire 2 is connected, to cover the entire connecting portion 6 with the coating resin 7 in a substantially equal thickness (see FIG. 2B).

Then, after the molding process which coats the connecting portion 6 with the coating resin 7 as described above is finished, the molds 11 are separated vertically. The wire harness 1 which has been treated with a resin molding process is removed from the shaping portions 12 of the molds 11 (see FIG. 2C) to complete manufacturing of the wire harness 1 (see FIG. 1E).

In the wire harness 1 manufactured with the above-described connecting device and manufacturing method, the portion of the insulator 4a, which is to be inserted into the terminal insertion hole 9 of the connector housing 8, is treated with the diameter reduction process. Thus, the outer periphery of the coating resin 7 coated on the insulator 4a of the reduced diameter portion can be made smaller than the terminal insertion hole 9 of the connector housing 8.

Therefore, for inserting the terminal 5 connected to the electric wire 2 of the wire harness 1 into the terminal insertion hole 9 of the connector housing 8, the outer peripheral surface of the coating resin 7 coated on the connecting portion 6 does not abut the inlet side peripheral portion of the terminal insertion hole 9. The terminal 5 connected to the electric wire 2 can be smoothly inserted into the terminal insertion hole 9 of the connector housing 8 (see FIG. 1F).

Further, in the case where the terminal 5 cannot be smoothly inserted into the terminal insertion hole 9, a poor electrical connection, which may happen when the connector is connected because the terminal 5 cannot be inserted to a predetermined position of the terminal insertion hole 9, can be prevented.

As a result, the terminal 5 can be inserted into connector housings 8 with a smaller terminal insertion hole 9. For example, it can be inserted into existing connector housings with small terminal insertion holes which have been applied to terminals which do not require coating with coating resins.

Since the terminal insertion hole 9 of the connector housing 8 does not have to be processed to be a big hole, the connector housing 8 itself does not have to be enlarged, or a dedicated connector housing 8 does not have to be newly manufactured, the manufacturing cost can be reduced.

Further, as the insulator 4 is made thin, the coating resin 7 to be coated on the insulator 4 can be made thick by that thickness. Therefore, environment deterioration such as crack, chap, or the like is unlikely to occur, and the waterproof property can be enhanced.

Further, since the entire length of the connecting portion 6 from the insulator coating portion 4X to the conductor crimping portion 5X is coated with the coating resin 7, it becomes possible to ensure connection between the electric wire 2 and the terminal 5 with no external force being directly applied to the conductor crimping portion 5X even there is no insulation barrel for crimping the insulator formed on the terminal, for example.

Further, when the outer periphery of the coated resin 7 coated on the connecting portion 6 of the wire harness 1 is formed so as to be substantially same as the inner periphery of the terminal insertion hole 9 of the connector housing 8, opposing surfaces of the coated resin 7 and the terminal insertion hole 9 contact each other closely. Accordingly, the terminal 5 of the wire harness 1 can be inserted into the terminal insertion hole 9 of the connector housing 8 without being loose.

Further, in the case where the conductor 3 of the electric wire 2 and the terminal 5 formed of dissimilar metals, for example, an aluminum conductor and a copper terminal, or the like, are connected, since the entire connecting portion 6 formed of the conductor exposed portion 3X, the insulator coated portion 4X and the conductor crimping portion 5X is coated with the coating resin 7, air, water, and the like can be prevented from entering the connecting portion 6 of the conductor 3 and the terminal 5, and the anticorrosion property can be enhanced.

As a result, even when a difference between normal electrode potentials of the conductor 3 and the terminal 5 is large, corrosion due to entrance of water and potential difference, i.e., dissimilar metals corrosion does not occur and stable connected state can be maintained.

FIGS. 3A through 3F are process drawings showing another manufacturing method for the wire harness 1 in which the insulator 4 coated on the end portion of the electric wire 2 is subjected to the diameter reduction and is cut off using the above-described connecting device.

In the above-mentioned manufacturing method, portions of the insulator 4 coated on the end portion of the electric wire 2, which are to be inserted into the terminal insertion hole 9 of the connector housing 8, i.e., the insulators 4a and 4b to be inserted into the terminal insertion hole 9 are pressurized in the radial direction toward the axial center of the electric wire 2 by the pressurizing members Ba of the insulator diameter reduction unit B and is processed so as to be thin.

In this way, the insulators 4a and 4b are treated with the diameter reduction process such that the outer periphery of the coated resin 7 coated on the insulator 4a is smaller than the terminal insertion hole 9 of the connector housing 8 (see FIGS. 3A and 3B).

Next, the insulator 4b of the tip side, which is to be inserted further from the inlet of the terminal insertion hole 9, is cut off from the insulators 4a and 4b of the reduced diameter portions by the cutting blade Aa of the insulator cutting off unit A, leaving the insulator 4a of the insulator coated portion 4X to be inserted around the inlet of the terminal insertion hole 9 of the connector housing 8.

Specifically, the conductor 3 of the electric wire 2 is exposed for a length which allows connection to the conductor crimping portion 5X of the terminal 5 (see FIG. 3C).

Next, for connecting the terminal 5 to the conductor 3 of the electric wire 2, the conductor 3 exposed at the end portion of the electric wire 2 is inserted into the conductor crimping portion 5X of the terminal 5, and the lower side of the terminal 5 is supported by the anvil Ca of the terminal crimping unit C. Then, the crimping piece 5a of the terminal 5 is treated with the calking process by the crimper Cb and is crimped to the conductor 3 of the electric wire 2 to connect the conductor crimping portion 5X of the terminal 5 to the conductor 3 of the electric wire 2 (see FIG. 3D).

Next, in the resin coating unit D shown in FIG. 2, for coating the connecting portion 6 where the conductor 3 of the electric wire 2 and the terminal 5 are connected with the coating resin 7, the connecting portion 6 where the conductor 3 and the terminal 5 are connected is set between the shaping portions 12 of the molds 11 of the resin coating device 10. Then, molten resin supplied from the resin supply which is not shown is injected into the resin injection space 13 between the shaping portions 12 (see FIG. 2A).

The coating resin 7 is applied to the connecting portion 6 formed of the conductor exposed portion 3X of the conductor 3, which is exposed at the end portion of the electric wire 2, the insulator coated portion 4X which is the portion adjacent to the conductor exposed portion 3X and is coated with the insulator 4a, and the conductor crimping portion 5X of the terminal 5, to which the conductor 3 of the electric wire 2 is connected, such that the coating resin 7 cover the entire connecting portion 6 in a substantially equal thickness (see FIG. 2D).

Then, after the molding process which coats the connecting portion 6 with the coating resin 7 as described above is finished, the molds 11 are separated vertically. The wire harness 1 which has been treated with the resin molding process is removed from the shaping portions 12 of the molds 11 to complete manufacturing of the wire harness 1 (see FIG. 3E).

The wire harness 1 manufactured with the above-described connecting device and manufacturing method is treated with the diameter reduction process for the portion of the insulator 4a, which is to be inserted into the terminal insertion hole 9 of the connector housing 8. Thus, the outer periphery of the coating resin 7 coated on the insulator 4a of the reduced diameter portion can be made smaller than the terminal insertion hole 9 of the connector housing 8.

Therefore, for inserting the terminal 5 of the wire harness 1 into the terminal insertion hole 9 of the connector housing 8, the coating resin 7 coated on the connecting portion 6 does not abut the inlet side peripheral portion of the terminal insertion hole 9. The terminal 5 of the wire harness 1 can be smoothly inserted into the terminal insertion hole 9 of the connector housing 8 (see FIG. 3F).

Further, in the case where the terminal 5 cannot be smoothly inserted into the terminal insertion hole 9, a poor electrical connection, which may happen when the connector is connected because the terminal 5 cannot be inserted to the predetermined position of the terminal insertion hole 9, can be prevented.

As a result, functions and effects substantially similar to those of the above-described embodiment can be achieved.

Figure 5A:
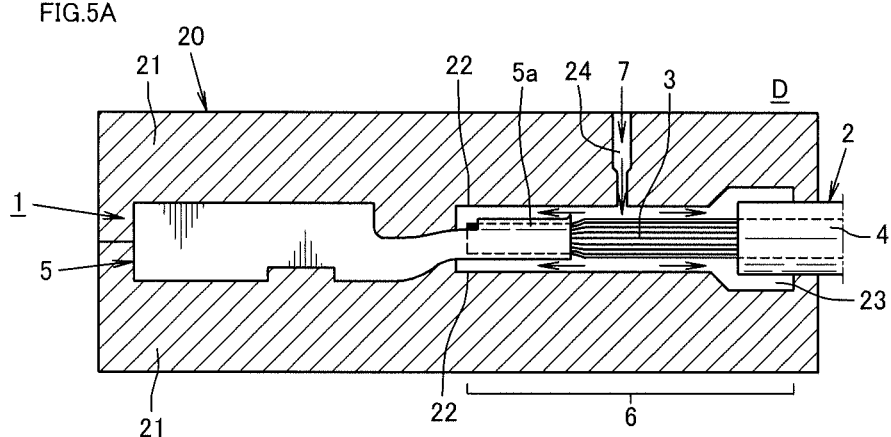
FIGS. 5A, 5B, and 5C show steps in a coating process for coating with the coating resin.
Figure 5B:
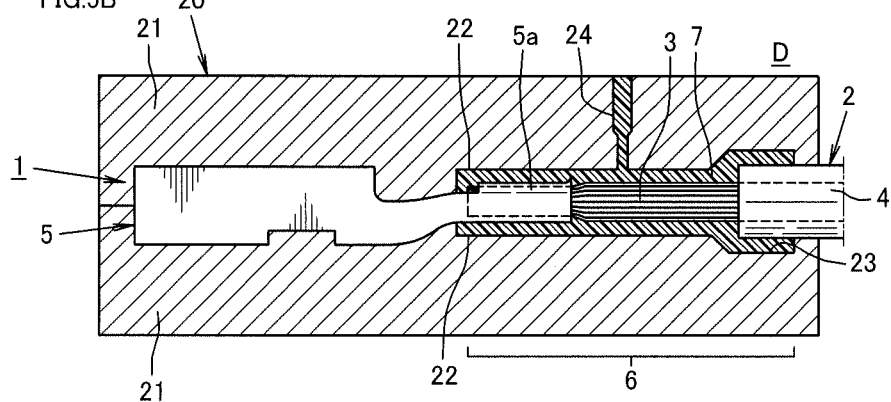

FIGS. 4A through 4E are process drawings showing another manufacturing method for the wire harness 1 in which the insulator 4 coated on the end portion of the electric wire 2 is cut off by a length which allows the conductor 3 on the end side to be exposed on the outer side from the terminal insertion hole 9 of the connector housing 8 using the above-described connecting device. FIGS. 5A and 5B are process drawings showing a coating method for coating the connecting portion 6 with the coating resin 7.

In the above-mentioned manufacturing method for manufacturing the wire harness 1, the insulator 4b which is a portion from an insertion portion to be inserted into the terminal insertion hole 9 to an exposed portion to be exposed outside the terminal insertion hole 9 is cut off from the insulator 4 coated on the end portion of the electric wire 2 by the cutting blade Aa, leaving the insulator coating portion 4X to be protruded outward from the inlet of the terminal insertion hole 9 of the connector housing 8.

In other words, the conductor 3 of the electric wire 2 is exposed by a length which allows it to be protruded outward from the inlet of the terminal insertion hole 9 (see FIGS. 4A and 4B).

Next, for connecting the terminal 5 to the conductor 3 of the electric wire 2, the conductor 3 exposed at the end portion of the electric wire 2 is inserted into the conductor crimping portion 5X of the terminal 5, and the lower side of the terminal 5 is supported by the anvil Ca of the terminal crimping unit C. Then, the crimping piece 5a of the terminal 5 is treated with the calking process by the crimper Cb and is crimped to the conductor 3 of the electric wire 2 to connect the conductor crimping portion 5X of the terminal 5 to the conductor 3 of the electric wire 2 (see FIG. 4C).

Figure 5C:
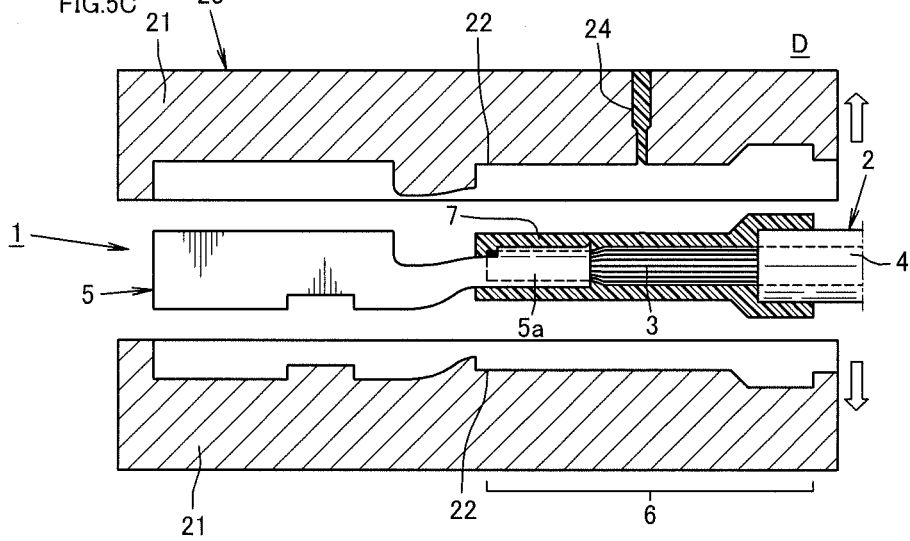
Figure 6:
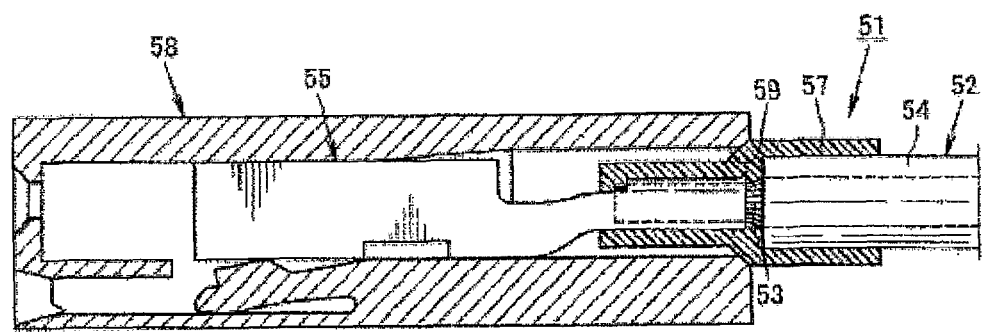
FIG. 6 is a cross-sectional side view showing an inserted state in a conventional wire harness.

Next, in a resin coating unit D shown in FIG. 5, as in the above-described embodiments, the connecting portion 6 where the conductor 3 and the terminal 5 are connected is set between molds 21 of the resin coating device 20, i.e., between shaping portions 22 of the molds 21. Then, molten resin supplied from the resin supply which is not shown is injected into the resin injection space 23 between the shaping portions 22 via a resin injection path 24 (see FIG. 5A).

The coating resin 7 is applied to the connecting portion 6 formed of a conductor exposed portion 3X of the conductor 3 exposed at an end portion of the electric wire 2, the insulator coated portion 4X which is the portion adjacent to the conductor exposed portion 3X and is coated with the insulator 4, and the conductor crimping portion 5X of the terminal 5, to which the conductor 3 of the electric wire 2 is connected, such that the entire connecting portion 6 is covered with the coating resin 7 in a substantially equal thickness (see FIG. 5B).

In other words, the coating resin 7 is directly applied to the conductor 3 to be inserted into the terminal insertion hole 9 of the connector housing 8, from which the insulator 4b has been stripped off.

Then, after the molding process which coats the connecting portion 6 with the coating resin 7 as described above is finished, the molds 21 are separated vertically. The wire harness 1 which has been treated with the resin molding process is removed from the shaping portions 22 of the molds 21 (see FIG. 5C) to complete manufacturing of the wire harness 1 (see FIG. 4D).

In the wire harness 1 manufactured with the above-described connecting device and manufacturing method, the insulator 4b from the portion to be inserted into the terminal insertion hole 9 to the portion exposed outside the terminal insertion hole 9 is cut off leaving the insulator coating portion 4X of the insulator 4, which is protruded to the outer side from the terminal insertion hole 9 of the connector housing 8. Then, the coating resin 7 is directly coated on the conductor 3 from which the insulator 4b has been stripped off.

In this way, the outer periphery of the coating resin 7 coated on the connecting portion 6 of the electric wire 2 can be made smaller than the terminal insertion hole 9 of the connector housing 8.

Therefore, for inserting the terminal 5 of the wire harness 1 into the terminal insertion hole 9 of the connector housing 8, an outer peripheral surface of the coating resin 7 coated on the connecting portion 6 does not abut the inlet side peripheral portion of the terminal insertion hole 9. The terminal 5 of the wire harness 1 can be smoothly inserted into the terminal insertion hole 9 of the connector housing 8 (see FIG. 4E).

When the wire harness 1 is manufactured with the above-described manufacturing method, only the conductor exposed portion 3X is the portion of the electric wire 2 in the terminal insertion hole 9. This can achieve better functions and effects than the above embodiments since there is no insulator 4 which is treated with the diameter reduction process. Also, since the step and a time period for the diameter reduction process for the insulator 4 coated on the end portion of the electric wire 2 can be omitted, the manufacturing cost can be reduced.

Further, since the entire length of the connecting portion 6 from the insulator coating portion 4X to the conductor crimping portion 5X is coated with the coating resin 7, it becomes possible to ensure connection between the electric wire 2 and the terminal 5 with no external force being directly applied to the conductor crimping portion 5X even there is no insulation barrel for crimping the insulator formed on the terminal, for example.

The resin coating device 20 has a substantially same structure as the resin coating device 10 in the above embodiments. Therefore, the detailed descriptions are omitted.

In the correspondence between the structure of the present invention and the above-described embodiments:

The insulator stripping means of the present invention corresponds to the insulator cutting off unit A;

The insulator thinning means corresponds to the insulator diameter reduction unit B;

The terminal crimping means corresponds to the terminal crimping unit C; and

The resin coating means corresponds to the resin coating unit D.

However, the present invention is not limited to the structures of the above-described embodiments, and can be applied based on the technical thoughts disclosed in the claims to achieve various embodiments.

For example, the conductor 3 of the electric wire 2 and the terminal 5 are connected, and then, the insulator 4 coated on the end portion of the electric wire 2 may be treated with the diameter reduction process.

Further, the terminal 5 in the above embodiments is formed of a terminal in which only the crimping piece 5a (wire barrel) is formed. Alternatively, it may be formed of a terminal in which an insulation barrel and a wire barrel are formed.

DESCRIPTION OF THE REFERENCE NUMERALS

A . . . Insulator cutting off unit
B . . . Insulator diameter reduction unit
C . . . Terminal crimping unit
D . . . Resin coating unit
1 . . . Wire harness
2 . . . Electric wire
3 . . . Conductor
3X . . . Conductor exposed portion
4, 4a, 4b . . . Insulator
5 . . . Terminal
5a . . . Crimping piece
5X . . . Conductor crimping portion
6 . . . Connecting portion
7 . . . Coating resin
8 . . . Connector housing
9 . . . Terminal insertion hole
10, 20 . . . Resin coating device
11, 21 . . . Mold

The invention claimed is:

1. A connecting structure for an electric wire and a terminal, in which a terminal to be inserted into a terminal insertion hole of a connector housing is crimped to a conductor exposed by stripping off a coated insulator at an end portion of an electric wire, and
a coating resin coated on a connecting portion formed of a conductor exposed portion of the conductor exposed at the end portion of the electric wire, an insulator coated portion which is adjacent to the conductor exposed portion and is coated with the insulator, and a conductor crimping portion of the terminal, to which the conductor is connected, is formed into a thickness which allows it to be inserted into the terminal insertion hole of the connector housing, wherein
a diameter of a portion, which is adjacent to the conductor exposed portion and covered by the coating resin, is smaller than that of the insulator coated portion which is away from the conductor exposed portion;
the terminal separates from the insulator coated portion; and
the coating resin covers from the conductor crimping portion of the terminal to the insulator coated portion.

2. A connecting structure for an electric wire and a terminal according to claim 1, wherein:
a portion of the insulator coated on the end portion of the electric wire, which is to be inserted further from an inlet of the terminal insertion hole, is stripped off, and the insulator of the insulator coated portion, which is to be inserted around the inlet of the terminal insertion hole, is processed to be thin.

3. A connecting structure for an electric wire and a terminal according to claim 1, wherein:
a portion of the insulator coated on the end portion of the electric wire, which is to be inserted into the terminal insertion hole, is processed to be thin, and a portion of the insulator, which is to be inserted further from an inlet of the terminal insertion hole, is stripped off, leaving the insulator coated portion which is to be inserted around the inlet of the terminal insertion hole.

4. A connecting structure for an electric wire and a terminal according to claim 1, wherein:
the insulator coated on the end portion of the electric wire is stripped off such that the conductor is exposed for a long length to an outer side from an inlet of the terminal insertion hole.

5. A wire harness formed of an electric wire having a connecting structure according to claim 1.

6. A wire harness formed of an electric wire having a connecting structure according to claim 2.

7. A wire harness formed of an electric wire having a connecting structure according to claim 3.

8. A wire harness formed of an electric wire having a connecting structure according to claim 4.

9. A connecting device for connecting an electric wire and a terminal, in which a terminal to be inserted into a terminal insertion hole of a connector housing is crimped to a conductor exposed by stripping off a coated insulator at an end portion of an electric wire, comprising:
insulator stripping means for stripping off the insulator coated on the end portion of the electric wire;
terminal crimping means for crimping the terminal to the conductor exposed by stripping off the insulator; and
resin coating means for coating a coating resin on a connecting portion formed of a conductor exposed portion of the conductor exposed at the end portion of the electric wire, an insulator coated portion which is adjacent to the conductor exposed portion and is coated with the insulator, and a conductor crimping portion of the terminal to which the conductor is connected, into a thickness which allows it to be inserted into the terminal insertion hole of the connector housing, wherein
a diameter of a portion, which is adjacent to the conductor exposed portion and covered by the coating resin, is smaller than that of the insulator coated portion which is away from the conductor exposed portion;
the terminal separates from the insulator coated portion; and
the coating resin covers from the conductor crimping portion of the terminal to the insulator coated portion.

10. A connecting device for an electric wire and a terminal according to claim 9, wherein:
a portion of the insulator coated on the end portion of the electric wire, which is to be inserted further from an inlet of the terminal insertion hole, is stripped off by the insulator stripping means, and the insulator of the insulator coated portion, which is to be inserted around the inlet of the terminal insertion hole, is processed to be thin by insulator thinning means.

11. A connecting device for an electric wire and a terminal according to claim 9, wherein:
a portion of the insulator coated on the end portion of the electric wire, which is to be inserted into the terminal insertion hole, is processed to be thin by the insulator thinning means, and a portion of the insulator, which is to be inserted further from an inlet of the terminal insertion hole, is stripped off by the insulator stripping means, leaving the insulator coated portion which is to be inserted around the inlet of the terminal insertion hole.

12. A connecting device for an electric wire and a terminal according to claim 9, wherein:

the insulator coated on the end portion of the electric wire is stripped off by the insulator stripping means such that the conductor is exposed for a long length to an outer side from an inlet of the terminal insertion hole.

13. A connecting method for an electric wire and a terminal, in which a terminal to be inserted into a terminal insertion hole of a connector housing is crimped to a conductor exposed by stripping off a coated insulator at an end portion of an electric wire, wherein:

the insulator coated on the end portion of the electric wire is stripped off, and the terminal is crimped to the conductor exposed by stripping off the insulator; and a connecting portion formed of a conductor exposed portion of the conductor exposed at the end portion of the electric wire, an insulator coated portion which is adjacent to the conductor exposed portion and is coated with the insulator, and a conductor crimping portion of the terminal to which the conductor is connected, is coated with a coating resin into a thickness which allows it to be inserted into the terminal insertion hole of the connector housing, wherein a diameter of a portion which is adjacent to the conductor exposed portion and covered by the coating resin, is smaller than that of the insulator coated portion which is away from the conductor exposed portion;

the terminal separates from the insulator coated portion; and the coating resin covers from the conductor crimping portion of the terminal to the insulator coated portion.

14. A connecting method for an electric wire and a terminal according to claim 13, wherein:

a portion of the insulator coated on the end portion of the electric wire, which is to be inserted further from an inlet of the terminal insertion hole, is stripped off, and the insulator of the insulator coated portion, which is to be inserted around the inlet of the terminal insertion hole, is processed to be thin.

15. A connecting method for an electric wire and a terminal according to claim 13, wherein:

a portion of the insulator coated on the end portion of the electric wire, which is to be inserted into the terminal insertion hole, is processed to be thin, and a portion of the insulator, which is to be inserted further from an inlet of the terminal insertion hole, is stripped off, leaving the insulator coated portion which is to be inserted around the inlet of the terminal insertion hole.

16. A connecting method for an electric wire and a terminal according to claim 13, wherein:

the insulator coated on the end portion of the electric wire is stripped off such that the conductor is exposed for a long length to an outer side from an inlet of the terminal insertion hole.

* * * * *